United States Patent [19]

Kirchner et al.

[11] Patent Number: 4,496,050
[45] Date of Patent: Jan. 29, 1985

[54] CASE FOR HOLDING FLAT ARTICLES

[75] Inventors: Balthasar Kirchner; Schleicher Siegfried, both of Eferding, Austria

[73] Assignee: Ernst Stadelmann Gesellschaft m.b.H., Eferding, Austria

[21] Appl. No.: 559,800

[22] Filed: Dec. 9, 1983

[30] Foreign Application Priority Data

Jun. 24, 1983 [EP] European Pat. Off. ........ 83890104.9

[51] Int. Cl.³ .................. B65D 43/16; B65D 85/57
[52] U.S. Cl. ............................. 206/444; 16/360; 16/365; 206/45.15; 206/45.18; 206/425; 220/331; 220/333
[58] Field of Search ............ 16/360, 365; 206/18, 206/39.3, 45.15, 45.17, 45.18, 45.2, 45, 23, 301, 387, 425, 444, 450, 472; 220/259, 329, 331–333, 334, 337

[56] References Cited

U.S. PATENT DOCUMENTS

| 2,116,758 | 5/1938 | Jacobs | 16/360 |
| 2,897,034 | 7/1959 | Kalen | 206/45.23 |
| 3,539,238 | 11/1970 | Kruspe et al. | 220/333 |
| 3,746,437 | 7/1973 | Pammer et al. | 220/331 |
| 4,356,918 | 11/1982 | Kahle et al. | 206/444 |
| 4,369,879 | 1/1983 | Egly et al. | 206/444 |
| 4,420,079 | 12/1983 | Gliniorz et al. | 206/45.23 |

FOREIGN PATENT DOCUMENTS

| 2100464 | 7/1972 | Fed. Rep. of Germany | 206/387 |
| 2202349 | 11/1972 | Fed. Rep. of Germany | 206/425 |

Primary Examiner—George E. Lowrance
Assistant Examiner—Jimmy G. Foster
Attorney, Agent, or Firm—Karl F. Ross; Herbert Dubno

[57] ABSTRACT

A case for holding floppy discs or other flat articles comprises a boxlike body and a cover, which is hinged to said body and can be turned up from the same. A compartment is defined by the inside surface of said cover and by a lid, which is hinged to the cover near its rear edge. To ensure that an opening movement of the cover will open also the lid, the latter is provided on its sides with cam follower pins, which engage respective cam tracks provided in the body. Each cam track comprises a portion which corresponds to an arc of a circle entered on the hinge axis on which the cover is hinged to the body. That cam track portion is succeeded in the direction of the opening movement of the cover by a cam track end portion, which deviates outwardly from said circle.

3 Claims, 1 Drawing Figure

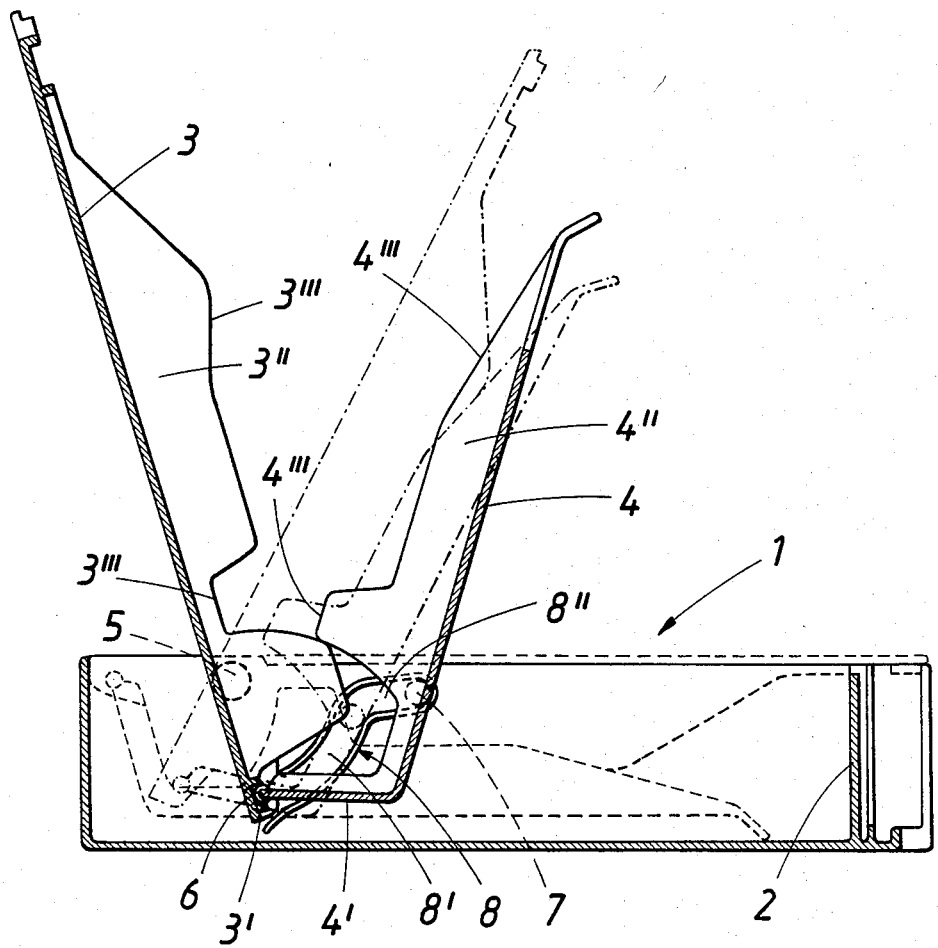

CASE FOR HOLDING FLAT ARTICLES

This invention relates to a case for holding flat articles, particularly floppy discs, comprising a boxlike body and a hinged cover, which is adapted to be turned up about a hinge axis which is spaced from the rear edge of the cover by a distance which is approximately as large as the height of the body, and a lid which is hinged to the cover at its rear edge and defines a compartment with the inside surface of the cover.

Such cases have proved satisfactory as a means for keeping floppy discs because the cases can be made in a simple manner and at low cost and the floppy discs can be kept in the case in an orderly arrangement and, above all, because the floppy discs are protected in the compartment from an ingress of dust when the cover is closed whereas when the cover has been turned open the compartment can be opened so that the floppy discs contained in the compartment will be freely accessible. In the previous embodiment, the lid is only loosely connected to the cover and is intended to turn down automatically under the action of gravity as far as to a stop, which is provided on the bottom of the case. As a result, the floppy discs are presented in a clear arrangement when the cover has been opened, and a search for certain floppy discs is facilitated because the floppy discs can be searched like leaves of a book. But inevitable manufacturing tolerances often cause the hinged lid to be seized so that when the cover which has been turned up the compartment must be opened by hand and the manipulation of the entire case is rendered difficult.

It is an object of the invention so to improve a case of the kind described first hereinbefore that the compartment will reliably be opened as the cover is turned up; this should be achieved with a minimum additional expenditure.

This object is accomplished in accordance with the invention in that the lid is provided with laterally protruding cam follower pins, which extend into respective cam tracks of the body, and each of said cam tracks comprises a circular portion, which extends along an arc of a circle that is centered on the hinge axis on which the cover is hinged to the body, and a cam track end portion, which succeeds said circular portion in the direction of the opening movement of the cover and deviates outwardly from said circle. As long as the cam follower pins move in the circular portions of the cam tracks during the turning of the cover, there will be no relative movement between the cover and the lid and the compartment will remain closed. The movement of the cam follower pins in that portion of the cam track which deviates from a circle will result in a relative movement between the cover and the lid so that the compartment will be positively opened. As a result, the turning up of the cover will reliably result in the desired turning-down movement of the lid to open the compartment and this will not be affected by manufacturing tolerances or by a soiling after prolonged use. As the cover is turned down to its initial position, the lid will be closed when the cam follower pins are moved along the end portion of the cam tracks and as soon as the cam follower pins enter the circular portion the lid will be turned into the body together with the cover. By a turning of the cover with one hand, the compartment will be automatically opened so that floppy discs can be conveniently taken or inserted; Because the compartment will be closed before the cover has been turned down to its closed position, the orderly arrangement of the floppy discs in the compartment will be preserved.

If the cover and the lid are provided with side cheeks, corresponding cheeks of the lid and of the cover are suitably formed with confronting edges, which abut when the compartment is closed, and said edges are preferably formed with serrations, which interengage when the compartment is closed. When the cheeks of the cover and of the lid abut each other, the compartment will be substantially closed and the guidance and support of the lid during its pivotal movement will be improved. This result will be further improved if the cheeks are formed with interengageable serrations. The provision of such serrations will also prevent a formation of straight through gaps between said cheeks as the compartment is opened so that no floppy discs can slip out through such gaps. Such slippage might tend to result in disorder and might cause the floppy discs to be damaged as the cover is closed.

The drawing is a diagrammatic longitudinal sectional view showing a case embodying the invention.

A plastic case 1 for accommodating floppy discs, phonograph records, magnetic tape cassettes or other flat articles consists of a boxlike body 2, a cover 3, and a lid 4, which together with the inside surface of the cover 3 defines a compartment for accommodating the flat articles. The cover is connected to the body 2 by a hinge 5 and can be turned up from the body about the axis of said hinge 5. That axis is spaced from the adjacent rear edge 3' of the cover 3 by a distance which is approximately as large as the height of the body 2. As a result, the rear edge 3' of the cover is turned down into the body 2 as the major portion of the cover is turned up. The rear wall 4' of the lid 4 is connected to the rear edge 3' of the cover 3 by a hinge 6. The lid 4 is provided on opposite sides with two laterally protruding cam follower pins 7, which extend into respective cam tracks 8 provided in the body 2. Each cam track 8 consists of a circular portion 8' corresponding to an arc of a circle which is centered on the axis of the hinge 5 connecting the cover to the body, and an end portion 8", which succeeds the circular portion 8' in the direction of the upward movement of the cover 3 and extends outwardly in a generally radial direction.

When the cover 3 is closed, the compartment is entirely confined in the body 2, as is indicated by dotted lines. In that position, confronting edges of corresponding side cheeks 3" and 4" of the cover 3 and lid 4, respectively, abut each other so that the compartment is also substantially closed. As the cover 3 is turned up, it carries the lid 4 along, which can freely follow that pivotal movement as long as the cam follower pins 7 move in the circular portion 8' of the cam tracks 8 (illustration by dash-dot lines). When the cam follower pins 7 have moved from the circular portion 8' into the end portion 8" of the cam tracks 8, a continued upward pivotal movement of the cover 3 will result in a relative movement between the lid 4 and the cover 3 so that the compartment will be opened (illustration in solid lines). In that position the compartment is freely accessible so that floppy discs or other flat articles can be inserted into the compartment at the desired locations or a desired floppy disc can be immediately found among the floppy discs contained in the compartment. As the cover 3 is closed, the hinge 6 and the cam follower pins 7 and the cam track 8 cooperate in such a manner that the compartment is positively closed first in that the cover 3 and the lid 4 are moved relative to each other until the cam follower pins 7 have entered the circular portion 8' of the cam track 8 and the cheeks 3", 4" abut each other. A continued downward pivotal movement of the cover 3 will then carry along the lid 4 into the body 2. The upward and downward pivotal movements of the lid 4 are facilitated by the fact that the cheeks 3", 4" engage and support each other. Confronting edges of said cheeks are formed with mating serrations 3''', 4''', respectively, which interengage when the compartment is closed so that a formation of straight through gaps between the cover 3 and the lid is prevented and floppy discs or other flat articles cannot escape from the compartment through such gaps.

What is claimed is:

1. In a case for holding flat articles, comprising
a boxlike body,
a cover,
a first hinge connecting said cover to said body on a first hinge axis, said cover having a rear edge, which is parallel to and disposed adjacent to said first hinge axis, said first hinge axis being spaced from said rear edge by a distance which is approximately as large as the height of said body so that said box is adapted to be opened by an upward movement of said cover about said first hinge axis,
a lid, which is disposed on the inside of said cover and defines a compartment with said cover and is movable relative to said cover to a position in which said compartment is closed, and
a second hinge, which is disposed at said rear edge and connects said lid to said cover on an axis which is parallel to said first hinge axis,
the improvement residing in that
said body is provided with two cam tracks, which are spaced apart along said axes and face opposite sides of said lid,
each of said cam tracks has a circular portion, which corresponds to an arc of a circle that is centered on said first hinge axis, and a cam track end portion, which succeeds said circular portion in the direction of said upward movement and deviates outwardly from said circle, and
said lid is provided with two cam follower pins, which protrude from said lid in mutually opposite lateral directions and each of which cooperates with one of said cam tracks.

2. The improvement set forth in claim 1 as applied to a case in which said cover and said lid are provided each with two side cheeks, which are spaced apart along said first hinge axis, wherein
corresponding ones of said side cheeks of said cover and said lid have confronting edges, which abut each other when said lid is in said position in which said compartment is closed.

3. The improvement set forth in claim 2, wherein said confronting edges of corresponding side cheeks of said cover and said lid are provided with serrations which interengage when said lid is in said position in which said compartment is closed.

* * * * *